Patented Jan. 30, 1951

2,539,438

UNITED STATES PATENT OFFICE 2,539,438

POLYMERIZED UNSATURATED TETRA-FLUOROSUCCINATE ESTER

Edward L. Kropa, Old Greenwich, and John J. Padbury, Stamford, Conn., assignors to American Cyanamid Company, New York, N. Y., a corporation of Maine No Drawing. Application April 1, 1947, Serial No. 738,737

22 Claims. (Cl. 260—45.4)

This invention relates to the production of new materials having valuable and characteristic properties that make them especially suitable for use in industry, for example, in molding, casting, coating, electrically insulating and adhesive applications, and for other purposes. More particularly the invention is concerned with tetrafluorosuccinic esters of a primary, ethylenically unsaturated monohydric alcohol containing at least 3 and not more than 10 carbon atoms and in which the hydroxy group is bonded through carbon to a monovalent, ethylenically unsaturated aliphatic, hydrocarbon grouping, for instance a tetrafluorosuccinic ester of allyl alcohol (specifically monoallyl tetrafluorosuccinate and diallyl tetrafluorosuccinate), a tetrafluorosuccinic ester of dimethallyl alcohol (specifically monomethallyl tetrafluorosuccinate and dimethallyl tetrafluorosuccinate), etc., and still more particularly with polymers and copolymers produced from such esters. The scope of the invention also includes method features whereby new and useful synthetic compositions are produced.

The tetrafluorosuccinic esters which are useful in the preparation of new and useful polymers and copolymers may be represented by the following formula:

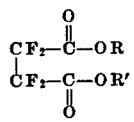

where R represents the residue of a primary, ethylenically unsaturated monohydric alcohol containing at least 3 and not more than 10 carbon atoms and in which the hydroxy group is bonded through carbon to a monovalent, ethylenically unsaturated aliphatic, hydrocarbon grouping, and R' has the same meaning as R and, in addition, hydrogen. Illustrative examples of monovalent hydrocarbon radicals which R and R' in the above formula may represent, and which may be the same or different, are: allyl, methallyl, ethallyl, propallyl, 2-butenyl, 3-butenyl, 3-methyl-2-butenyl, 3-methyl-3-butenyl, 2-pentenyl, 3-pentenyl, 4-pentenyl, 2-methyl-2-pentenyl, 3-methyl-4-pentenyl, 2-hexenyl, 1,3-pentadienyl, 2,4-hexadienyl, 2-octenyl, 3-nonenyl, 2-decenyl, etc. Such esters may be polymerized alone or admixed with other monomeric or partially polymerized materials which are different therefrom and which are copolymerizable therewith. Mixtures of different esters of the kind embraced by Formula I also may be copolymerized in the presence or absence of other copolymerizable materials to yield new and valuable synthetic compositions which are especially suitable for use in the plastics, coating and other arts. The ultimate products, both polymers and copolymers, may be broadly described as being compositions comprising the product of polymerization of a polymerizable mass including a tetrafluorosuccinic ester, more particularly a tetrafluorosuccinic diester, of a primary, ethylenically unsaturated monohydric alcohol containing at least 3 and not more than 10 carbon atoms and in which the hydroxy group is bonded through carbon to a monovalent, ethylenically unsaturated aliphatic, hydrocarbon grouping.

Also within the scope of the present invention are polymerizable compositions comprising (1) a tetrafluorosuccinic ester, specifically a tetrafluorosuccinic diester, of the kind described in the first paragraph of this specification and (2) a monomeric material which is different from the compound of (1) and which is copolymerizable therewith; as well as products comprising the polymerized composition. The monomeric material which is incorporated into such polymerizable compositions may be a compound containing a $CH_2=C<$ grouping (that is, a single $CH_2=C<$ grouping or a plurality of $CH_2=C<$ groupings), which compound is different from the tetrafluorosuccinic ester, e. g., styrene, methyl acrylate, methyl methacrylate, vinyl acetate, diallyl phthalate, divinyl benzene, etc.; a polymerizable unsaturated alkyd resin, e. g., ethylene glycol maleate, diethylene glycol fumarate, triethylene glycol itaconate, diethylene glycol maleate phthalate, diethylene glycol fumarate sebacate, etc.; a polymerizable polyalkyl ester of an unsaturated alpha, beta-polycarboxylic acid of the aliphatic series, more particularly a polyalkyl ester of an alpha,beta-unsaturated polycarboxylic acid, e. g., dimethyl fumarate, diethyl fumarate, diethyl maleate, dipropyl itaconate, tributyl aconitate, etc.; or mixtures of any two or all of such monomeric materials. Polymerized products also may be prepared from polymerizable compositions containing such monomeric or partially polymerized materials having incorporated therein a soluble polymer of a tetrafluorosuccinic ester of the kind with which this invention is concerned, e. g., a soluble polymer of monoallyl or diallyl tetrafluorosuccinate, monomethallyl or dimethallyl tetrafluorosuccinate; etc.

One of the objects of this invention is to prepare a new class of compositions comprising certain esters, which compositions are characterized both by their polymerizability and by their flame-resistance characteristics, especially in their cured or substantially completely polymerized state.

Another object of the invention is to prepare new and useful resins and to obtain clear and colorless gels.

Another object of the invention is to provide potentially polymerizable molding and other compositions which have good storage stability and which can be handled without difficulty prior to and during fabrication.

Another object of the invention is to control the rate of polymerization of the reactive mass or mixture, as well as to improve the properties and characteristics of the resulting gels.

Still another object of this invention is to prepare synthetic materials which are particularly suitable for use as coating compositions and as components of coating compositions, which compositions have improved flame resistance over compositions of similar formulation but containing no tetrafluorosuccinic ester.

Another object of the invention is to prepare molding compositions from which can be produced clear, colored or translucent molded articles having improved flame-resisting properties.

Another object of the invention is to prepare clear and colorless cast articles, as well as laminated moldings having high strength characteristics combined with a high resistance to flame, that is, slow-burning tendencies, as well as other desirable properties.

Another object of the invention is to improve the electrical characteristics of unsaturated alkyd and other resins, both crystalline and amorphous, and to provide resins which are more flame resistant than the unmodified resin.

Other objects will be apparent to those skilled in the art from the following more detailed description.

These and other objects are accomplished as broadly described hereinbefore and more fully hereafter.

It was known prior to our invention that diallyl succinate could be prepared and that this ester could be polymerized alone and with other polymerizable materials, e. g., an unsaturated alkyd resin, to yield polymeric and copolymeric materials.

The present invention is based on our discovery that new and valuable materials having particular utility in the plastics, coating and other arts can be produced by the esterification (partial or complete esterification) of tetrafluorosuccinic acid or anhydride with a primary, ethylenically unsaturated monohydric alcohol containing at least 3 and not more than 10 carbon atoms and in which the hydroxy group is bonded through carbon to a monovalent, ethylenically unsaturated aliphatic, hydrocarbon grouping; and upon our further discovery that such esters can be polymerized alone or in combination with various other monomeric materials to yield resinous and other compositions having new and improved properties over similar compositions heretofore known. The high fluorine content of the esters of this invention, and from which polymers and copolymers can be made, imparts heat-, flame- and chemical-resistance characteristics to such polymeric materials, while the ester grouping (especially those which contain more than four carbon atoms in the ester chain) adds to the workability or handling of the polymers and copolymers produced from such esters. This ease of workability or handling is in marked contrast to that of many of the highly fluorinated resinous materials (e. g., polymeric tetrafluoroethylene) now being used or which have been suggested for use in the plastics and coating arts. The present invention therefore provides a resinous composition which readily can be molded or otherwise fabricated into useful articles of manufacture, without material sacrifice of the good electrical, chemical and flame-resisting characteristics imparted thereto by reason of its relatively high percentage of fluorine. Other improved properties, including high resistance to heat, abrasion and organic solvents, of the hard, polymerized tetrafluorosuccinic esters or mixtures thereof with other monomeric or partially polymerized materials used in practicing this invention render them suitable for use in fields of utility, for instance in electrically insulating and coating applications, for which polymeric and copolymeric materials of lesser resistance to heat, abrasion and organic solvents would be entirely unsuited.

The tetrafluorosuccinic esters of our invention are prepared, for example, by the esterification of tetrafluorosuccinic acid or anhydride with an alcohol corresponding to the ester desired in the presence of a suitable esterification catalyst and in the presence or absence of other unreactive bodies, e. g., benzene, toluene, etc., to aid in the removal of the water resulting from the esterification. This method may be carried out continuously. They also may be prepared by ester exchange reactions in the presence of a suitable inhibiting agent, such as a phenolic body, and a suitable catalyst, the reaction proceeding as in an alcoholysis. Thus, in the preparation of, for instance, diallyl tetrafluorosuccinate, the reactants may comprise allyl alcohol and dimethyl or diethyl tetrafluorosuccinate, hydroquinone as an inhibiting agent and a catalyst such as metallic sodium, potassium carbonate, sulfuric acid, etc. The symmetrical diesters of this invention also may be made from tetrafluorosuccinonitrile by causing to react therewith an alcohol corresponding to the ester desired in the presence of water and an inorganic acid. Or, they may be prepared from tetrafluorosuccinyl chloride and a selected alcohol.

The mixed esters of this invention, that is, tetrafluorosuccinic diesters in which the ester groupings contain different unsaturated monovalent hydrocarbon radicals, also may be prepared in various ways. Illustrative examples of such esters are allyl methallyl tetrafluorosuccinate, methallyl 2-butenyl tetrafluorosuccinate, etc. These mixed esters may be prepared, for instance, by effecting reaction between tetrafluorosuccinic acyl chloride monoester (of a particular unsaturated alcohol) and a different unsaturated alcohol in the presence of an inhibitor, e. g., a phenolic body. These mixed esters also may be made by direct consecutive esterification of each of the carboxyl groups of tetrafluorosuccinic acid with different alcohols, or by treating tetrafluorosuccinyl chloride first with one alcohol and then with another. They also may be prepared by saponification of one group of a tetrafluorosuccinic unsaturated diester with alcoholic potassium hydroxide in the cold and either isolating the monoacid from the potassium salt for further reaction with the selected alcohol or causing the potassium salt to react directly with an alkenyl or other unsaturated hydrocarbon sulfate corresponding to the ester desired.

For optimum results all of the above-described reactions for the preparation of the esters preferably are conducted at a temperature not exceeding substantially 200° C.

We prefer to prepare the monoesters and the symmetrical diesters of this invention by direct esterification of tetrafluorosuccinic acid or anhydride with an alcohol corresponding to the ester desired, advantageously at a temperature not exceeding substantially 200° C. In the preparation of the diesters an excess of the alcohol over that theoretically required for reaction with the tetrafluorosuccinic acid or anhydride to form the diester ordinarily is employed, but equivalent molar proportions may be used if desired, that is, two mols of the unsaturated monohydric alcohol per mol of the tetrafluorosuccinic acid or anhydride. In the preparation of the monoester by this method, the reactants usually are employed in equal molar proportions. The resulting esterification product is generally a mixture of monoester and diester, which may be separated by suitable means, e. g., by distillation. The preparation of tetrafluorosuccinic acid and tetrafluorosuccinic anhydride is described in our copending application Serial No. 731,422, filed February 27, 1947, now Patent No. 2,502,478, issued April 4, 1950.

The following examples are illustrative of how esters of this invention, specifically diallyl tetrafluorosuccinate and dimethallyl tetrafluorosuccinate, may be prepared. All parts are by weight.

EXAMPLE 1

*Preparation of diallyl tetrafluorosuccinate*

| | Parts | Approx. Molar Ratio |
|---|---|---|
| Tetrafluorosuccinic acid | 380 | 1.0 |
| Allyl alcohol | 513 | 4.4 |
| Anhydrous benzene | 527 | |
| p-Toluene sulfonic acid | 5 | |

The above ingredients are charged to a 2-necked reaction vessel provided with an 11-plate Brunn column surmounted by a water-separating trap holding a reflux condenser. A slow stream of dry carbon dioxide is swept through the system to exclude air. The reaction mass is heated under gentle reflux for 8 hours, at the end of which period of time no more water is collected in the trap. The product is distilled under reduced pressure through a 3-bulb Snyder column, the fraction boiling at 65°–68.5° C. at 1 mm. pressure being collected as diallyl tetrafluorosuccinate. The yield of diallyl ester is 475 parts, which corresponds to 88% of the theoretical. The crude diallyl tetrafluorosuccinate is distilled over 5 parts of calcium carbonate. The redistilled diester has the following properties: B. P. 65°–68° C. at 1 mm.; $n_D^{25}$, 1.3937; $d_4^{25}$, 1.2526; saponification equivalent, 134.4 (theoretical, 135.0).

EXAMPLE 2

*Preparation of dimethallyl tetrafluorosuccinate*

| | Parts | Approx. Molar Ratio |
|---|---|---|
| Tetrafluorosuccinic acid | 190 | 1.0 |
| Methallyl alcohol | 511 | 7.1 |
| Anhydrous benzene | 263 | |

The tetrafluorosuccinic acid, benzene and one-third of the methallyl alcohol are heated under gentle reflux in a reaction vessel as described under Example 1 for 100 minutes, after which another one-third portion of the methallyl alcohol is added and refluxing is continued for 3 hours and 5 minutes. The remainder of the methallyl alcohol is now added and refluxing is continued for another 70 minutes. The benzene and the unreacted methallyl alcohol are distilled off at 50 mm. pressure, and the residue is distilled through a 3-bulb Snyder column to isolate crude dimethallyl tetrafluorosuccinate which is redistilled at 1 mm. pressure, yielding a purer material boiling at 78°–85° C. and having a refractive index at 25° C. of 1.4095.

In carrying the present invention into effect the tetrafluorosuccinic esters may be polymerized separately, or mixed with each other, or mixed with other polymerizable materials. Heat, light or heat and light may be used to effect polymerization, although under such conditions the rate of polymerization is relatively slow. Hence, to accelerate the polymerization we prefer to use a catalyst accompanied by heat, light or heat and light. Further details on polymerization conditions are given hereinafter.

Substantially insoluble, substantially infusible resins may be prepared by means of the chemical reaction or polymerization of a mixture containing a resin possessing a plurality of polymerizably reactive alpha, beta-enal groups (that is, the grouping

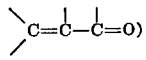

and a tetrafluorosuccinic ester of the kind embraced by Formula I. Such mixtures may be utilized in coating compositions, molding compositions, laminating compositions, casting compositions, adhesives, etc. The resins used in such mixtures and which possess a plurality of polymerizably reactive alpha,beta-enal groups are designated herein as "reactive resins" or as "unsaturated alkyd resins."

Among the reactive resins used in practicing our invention as a reactant with a tetrafluorosuccinic ester of the kind described hereinbefore are those which are derived from unsaturated alpha, beta-organic acids of the aliphatic series and, therefore, contain the reactive groupings present in those acids. The term "acids" as used herein is intended to include the anhydrides as well as the acids themselves, since the former may be used instead of the acid. The terms "unsaturated alpha, beta-organic acid" and "alpha, beta-unsaturated organic acid" as commonly used in the art do not include acids wherein the unsaturated grouping is part of an aromatic-acting radical, as for example phthalic acid, and the same definition is adopted herein.

The unsaturated alkyd resins are preferably produced by the esterification of an unsaturated alpha,beta-polycarboxylic acid of the aliphatic series, more particularly an alpha,beta-unsaturated polycarboxylic acid, with a polyhydric alcohol, and particularly a glycol. Although esterification of the acid with a polyhydric alcohol is perhaps one of the simplest, most convenient ways of obtaining a reactive resin, we are not precluded from using resins otherwise derived from unsaturated alpha,beta-organic acids. We also may employ a crystalline unsaturated alkyd resin obtained by the reaction of a glycol, which is completely symmetrical, with an alpha,beta-unsaturated dicarboxylic acid having a transfiguration such as fumaric acid. The unsaturated alkyd resin is preferably one having an acid number not greater than 50, although in some cases resins having an acid number as high as 100 may be employed. The term "unsaturated alkyd resin" as used herein does not include within its meaning the conventional drying oil- or drying oil acid-modified alkyd resins in the preparation of which an aromatic or saturated aliphatic polycarboxylic acid or anhydride is used.

Illustrative examples of unsaturated alkyd resins that may be employed are those produced by reaction of the following ingredients: ethylene glycol and maleic anhydride; glycerine and maleic anhydride; diethylene glycol, maleic anhydride and phthalic anhydride; diethylene glycol and itaconic acid; ethylene glycol, maleic anhydride and succinic acid; ethylene glycol, maleic anhydride and tetrafluorosuccinic acid; ethylene glycol, itaconic acid and phthalic anhydride; diethylene glycol, maleic anhydride and tung oil acids; ethylene glycol, maleic anhydride, linseed oil acids and phthalic anhydride; diethylene glycol and maleic anhydride; ethylene glycol, maleic anhydride and stearic acid; diethylene glycol, maleic anhydride and decyl alcohol; ethylene glycol, maleic anhydride, octyl alcohol and acetic anhydride; diethylene glycol, fumaric acid, tetrahydroabietyl alcohol and linseed oil fatty acids; alpha-propylene glycol and maleic anhydride; diethylene glycol, fumaric acid and benzyl alcohol; diethylene glycol, fumaric acid and tetrahydroabietyl alcohol; ethylene glycol, fumaric acid and omega-hydroxydecanoic acid; diethylene glycol, fumaric acid and linseed oil fatty acid monoglycerides; etc. Reference is made to various copending applications of one of us (Edward L. Kropa) for more detailed information regarding the ingredients, the preparation and additional examples of modified and unmodified unsaturated alkyd resins that may be copolymerized with a tetrafluorosuccinic ester of the kind embraced by Formula I to yield new synthetic compositions, for instance, copending applications Serial Nos. 540,142, filed June 13, 1944, now Patent 2,443,740; 555,194, filed September 21, 1944, now Patent No. 2,443,741; 564,723, filed November 22, 1944; 616,648, filed September 15, 1945; 653,959, filed March 12, 1946, now Patent No. 2,485,294. October 18, 1949; 700,833, filed October 2, 1946, now Patent No. 2,510,503, June 6, 1950, and 702,599, filed October 11, 1946; and to Kropa Patent No. 2,409,633, issued October 22, 1946.

Illustrative examples of other monomeric materials that may be copolymerized with compounds of the kind embraced by Formula I are the reactive compounds which contain a $CH_2=C<$ grouping different from those embraced by the said formula, more particularly different allyl compounds, and especially different allyl compounds which have a boiling point of at least about 60° C. Of the monomeric materials which may be used the allyl esters (different from the allyl tetrafluorosuccinates) form a large class, all of which are suitable. The reactive allyl compounds which have been found to be most suitable are those which have a high boiling point such, for example, as diallyl maleate, diallyl fumarate, diallyl phthalate, diallyl succinate, etc. Other allyl compounds which are not necessarily high boiling also may be used. More specific examples of allyl compounds that may be copolymerized with a tetrafluorosuccinic ester of the kind embraced by Formula I are: allyl alcohol, methallyl alcohol, allyl acetate, allyl lactate, the allyl ester of alpha-hydroxyisobutyric acid, allyl trichlorosilane, allyl acrylate, allyl methacrylate, diallyl carbonate, diallyl malonate, diallyl oxalate, diallyl gluconate, diallyl methylgluconate, diallyl adipate, diallyl azelate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetrallyl silane, tetrallyl silicate, hexallyl disiloxane, etc.

Other examples of allyl compounds that may be employed are given, for example, in the aforementioned Kropa copending application Serial No. 700,833 and in the applications referred to therein.

Examples of other monomeric materials which may be copolymerized with tetrafluorosuccinic esters of the kind described in the first paragraph of this specification are the unsaturated alcohol esters which are different therefrom, more particularly the allyl, methallyl, crotyl, 1-chloroallyl, 2-chloroallyl, cinnamyl, vinyl, methvinyl, 1-phenylallyl, butenyl, propargyl, butynyl, etc., esters of saturated and unsaturated, aliphatic and aromatic, monobasic and polybasic acids such, for instance, as acetic, propionic, butyric, valeric, caproic, acrylic, alkacrylic (e. g., methacrylic, ethacrylic, etc.), crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e. g., the methyl, ethyl, propyl, butyl, isobutyl, etc., esters of unsaturated aliphatic monobasic and polybasic acids, illustrative examples of which appear above; vinyl cyclic compounds (including monovinyl aromatic hydrocarbons), e. g., styrene, chlorostyrenes, dichlorostyrenes, methyl styrenes, dimethyl styrenes, vinyl naphthalene, vinyl cyclohexane, vinyl furane, vinyldibenzofuran, divinyl benzene, etc.; unsaturated ethers, e. g., ethyl vinyl ether, diallyl ether, methallyl ethyl ether, etc.; unsaturated amides, for instance, N-allyl caprolactum, acrylamide and N-substituted acrylamides, e. g., N-methylol acrylamide, N-methyl acrylamide, N-allyl acrylamide, etc.; unsaturated ketones, e. g., methyl vinyl ketone, methyl allyl ketone, etc.; methylene malonic esters, e. g., methylene methyl malonate, etc.; butadienes, e. g., 1,3-butadiene, 2-chlorobutadiene, etc.; unsaturated polyhydric alcohol (e. g., butenediol, butynediol, etc.) esters of saturated and unsaturated aliphatic and aromatic, monobasic and polybasic acids, illustrative examples of which appear above.

Mixtures of any of the aforementioned polymerizable materials may be copolymerized with a single or with a plurality of tetrafluorosuccinic esters of the kind embraced by Formula I. For example, we may copolymerize with the tetrafluorosuccinic ester an unsaturated alkyd resin alone, e. g., diethylene glycol maleate, etc., or a compound containing a $CH_2=C<$ grouping alone, e. g., styrene, diallyl succinate, triallyl cyanurate, etc., or a mixture of such a resin and compound. The tetrafluorosuccinic ester enhances the properties of the resulting copolymer. For example, it increases the chemical resistance, flame resistance and other properties such as have been mentioned hereinbefore.

The proportions of tetrafluorosuccinic ester, examples of which have been given hereinbefore, and monomeric material which is copolymerized therewith, examples of which likewise have been given hereinbefore, may be varied as desired or as conditions may require, but ordinarily the proportions thereof in the polymerizable mixture will be within the range of, by weight, from about 10 to 90 per cent, more particularly from 20 to 80 per cent, of the former to from about 90 to 10 per cent, more particularly from 80 to 20 per cent of the latter. Some combinations of tetrafluorosuccinic ester and other monomers copolymerizable therewith result in opaque gels while others give clear products in the gel state. Obviously, for many purposes the opaque gel may be used equally as well as the clear gel.

Any suitable means may be used in effecting polymerization of the tetrafluorosuccinic ester alone or admixed with a compound copolymerizable therewith. Heat or light or both, with or without a polymerization catalyst, may be employed. Ultraviolet light is more effective than ordinary light. The polymerization of the polymerizable composition is preferably accelerated by incorporating a polymerization catalyst therein. The polymerization catalysts include the organic superoxides, alcoholic and acidic peroxides. Among the preferred catalysts are: the acidic peroxides, e. g., benzoyl peroxide, phthalic peroxide, succinic peroxide and benzoyl acetic peroxide; fatty oil acid peroxides, e. g., coconut oil acid peroxides, lauric peroxide, stearic peroxide and oleic peroxide; alcoholic peroxides, e. g., tert.-butyl hydroperoxide; and terpene oxides, e. g., ascaridole. Still other polymerization catalysts may be used in some cases, e. g., soluble cobalt salts (particularly the linoleate and naphthenate), p-toluene sulfonic acid, aluminum chloride, stannic chloride, boron trifluoride, etc.

The concentration of the catalyst employed is usually small, that is, for the preferred catalysts from, by weight, about 1 part of catalyst per thousand parts of the material or mixture of materials to be polymerized to about 2 parts of catalyst per hundred parts of the said material or mixture. If an inhibitor be present, up to 5% or even more by weight of catalyst, based on the weight of the polymerizable composition, may be necessary according to the concentration of the inhibitor. In most cases the temperature of copolymerization will be within the range of 40° to 200° C., usually within the range of 60° to 130° C., depending upon the particular monomer or mixture of copolymerizable materials employed, the particular catalyst, if any, used, the rapidity of copolymerization wanted, and other influencing factors.

In some cases it is desirable to incorporate a polymerization inhibitor with the monomeric tetrafluorosuccinic ester or mixture thereof with another copolymerizable material or materials. When it is desired to use this mixture, a catalyst is added in an amount sufficient to promote the polymerization and to form a polymer or copolymer. By careful control of the concentrations of inhibitor and catalyst, a uniform product is obtainable with a good reaction velocity. Suitable polymerization inhibitors for this purpose are phenolic compounds, especially the polyhydric phenols, and aromatic amines. Specific examples of this group of inhibitors are hydroquinone, benzaldehyde, ascorbic acid, isoascorbic acid, resorcinol, tannin, symmetrical di-(β-naphthyl)-p-phenylene diamine, phenolic resins, sulfur compounds, etc. The concentration of the inhibitor is preferably low, and less than about 1% by weight of the polymerizable composition is usually sufficient. However, with the preferred inhibitors, e. g., polyhydric phenols and aromatic amines, we prefer to use only about 0.01 to about 0.1% by weight of inhibitor, based on the weight of the polymerizable composition.

It may sometimes be desirable to reduce the viscosity of a liquid mixture of an unsaturated alkyd resin and a tetrafluorosuccinic ester of the kind used in practicing the present invention, as for instance when a very viscous resin is employed in the preparation of such a mixture or composition that is to be used in coating applications. This reduction in viscosity may be effected by adding, for instance, an esterification catalyst, e. g., p-toluene sulfonic acid, and then heating the resulting mixture until the viscosity is reduced. The mechanism of this change is probably re-esterification. It is also desirable to add a polymerization inhibitor before the heating or "thinning" process. This procedure also is useful when the polymerizable composition is to be baked at a high temperature, under which conditions some of the volatile components of the composition otherwise might be lost in part by evaporation. If this "thinning" process is carried out, the tetrafluorosuccinic ester is combined with the unsaturated alkyd resin by re-esterification and is not lost when the composition is heated at a baking temperature.

In casting, molding or other applications of some of the polymerizable compositions of this invention, it may sometimes be desirable to body the composition before adding the catalyst in order to reduce the induction period, which otherwise may be too long for the particular application. This may be done, for example, by heating the mixed ingredients at a suitable temperature, e. g., at from about 70° to about 110° C., preferably at about 90° C., for a period sufficient to reduce substantially the induction period. This time will vary depending upon such influencing factors as, for example, the particular mixture of ingredients employed, its initial viscosity and other such factors, but may be determined by observation of the increase in viscosity. Heating should be continued until the viscosity begins to increase rapidly. A general rule for determining the heating time is to heat the mixture until the viscosity is about two to three times the initial viscosity.

After the bodying operation, the polymerization catalyst is added to the mixture and the whole is subjected to polymerization conditions. The use of liquid peroxides instead of solid peroxides is an advance after bodying the resin mixture, since it is difficult to get the solid peroxides dissolved rapidly enough. Peroxides of coconut oil acids, tertiary-butyl hydroperoxide and ascaridole are suitable liquid peroxides that may be employed. By the use of this process the induction period is reduced from approximately ½ to ⅛ that required when the bodying process is not used with liquid polymerizable compositions. Even greater reductions are obtained in the case of some compositions. Additional details with regard to the bodying of the more reactive polymerizable compositions are given, for example, in the aforementioned Kropa copending application Serial No. 555,194.

In many cases it is desirable to produce a polymerizable composition of a particular viscosity for a particular application. This may be done, for example, by partially polymerizing a tetrafluorosuccinic ester of the kind embraced by Formula I, and then incorporating the partial polymer, e. g., a partial polymer of diallyl or dimethallyl tetrafluorosuccinate, etc., into a monomeric material which is copolymerizable therewith, e. g., a polymerizable polyalkyl ester of an unsaturated alpha,beta-polycarboxylic acid of the aliphatic series, more particularly a polyalkyl ester of an alpha,beta-unsaturated polycarboxylic acid, e. g., dimethyl fumarate, diethyl fumarate, etc., or a liquid unsaturated alkyd resin. In this way, the viscosity of the monomer conveniently may be increased to the point desired.

In order that those skilled in the art better may understand how the new polymers and copolymers of this invention may be produced, the following examples are given by way of illustration and not by way of limitation. All parts are by weight.

EXAMPLE 3

| | Parts |
|---|---|
| Diallyl tetrafluorosuccinate | 30.0 |
| Benzoyl peroxide | 0.3 | are heated together for 3 hours at 105° C., yielding a transparent, insoluble polymeric solid.

The polymer supports combustion less readily, that is burns more slowly than a polymer of diallyl succinate, and is suitable for uses, e. g., in electrically insulating applications, in making flame-resistant laminated articles, etc., for which diallyl succinate would be either wholly unsuited or would have only limited utility.

EXAMPLE 4

| | Parts |
|---|---|
| Diallyl tetrafluorosuccinate | 30.0 |
| Diethylene glycol fumarate sebacate[1] | 30.0 |
| Benzoyl peroxide | 0.3 |

[1] NOTE.—This unsaturated alkyd resin is prepared by effecting reaction between 6 mols diethylene glycol, 5 mols fumaric acid and 1 mol sebacic acid.

The above ingredients are mixed and warmed to effect solution. A hard, well-cured insoluble, transparent, resinous copolymer is obtained by heating the resulting polymerizable composition for 1 hour at 105° C.

EXAMPLE 5

| | Parts |
|---|---|
| Diallyl tetrafluorosuccinate | 100 |
| Methyl methacrylate | 100 |
| Benzoyl peroxide | 2 | yield a clear, colorless, hard, well-cured copolymer upon heating for 16 hours at about 65° C. The hardness is increased by further heating for 2½ hours at 110° C., during which period the copolymer develops a slightly yellow color.

EXAMPLE 6

| | Parts |
|---|---|
| Diallyl tetrafluorosuccinate | 100 |
| Styrene | 100 |
| Benzoyl peroxide | 2 | are heated together for 16 hours at 65° C., yielding a copolymer which is clear, colorless and a quite viscous liquid while hot but a soft, opaque solid at room temperature.

EXAMPLE 7

| | Parts |
|---|---|
| Dimethallyl tetrafluorosuccinate | 100 |
| Styrene | 100 |
| Benzoyl peroxide | 2 | are heated together for 16 hours at 65° C. and then for 22½ hours at 110° C. to obtain a copolymer which is an opaque solid at room temperature.

EXAMPLE 8

| | Parts |
|---|---|
| Dimethallyl tetrafluorosuccinate | 100 |
| Methyl methacrylate | 100 |
| Benzoyl peroxide | 2 | yield a clear, hard, abrasion-resistant copolymer when heated together for 16 hours at about 65° C. There is no apparent change in the appearance of the copolymer upon additional heating for 22½ hours at 110° C.

EXAMPLE 9

| | Parts |
|---|---|
| Dimethallyl tetrafluorosuccinate | 9.5 |
| Diethylene glycol fumarate sebacate prepared as described under Example 4 | 28.6 |
| Benzoyl peroxide | 0.2 |

The first two ingredients are mixed and heated to 100° C., after which the benzoyl peroxide is added and thoroughly mixed with the polymerizable mixture. Upon heating the resulting mass for 2½ hours at 110° C., a clear, solid, non-tacky, resinous copolymer is obtained.

EXAMPLE 10

| | Parts |
|---|---|
| Diethylene glycol maleate | 90 |
| Diallyl tetrafluorosuccinate | 10 |
| Lauroyl peroxide | 2 | yield a hard, well-cured copolymer upon heating together for 2 hours at 100° C. and for another 2 hours at 110° C.

EXAMPLE 11

| | Parts |
|---|---|
| 2,5-dichlorostyrene | 75 |
| Diallyl tetrafluorosuccinate | 25 |
| Lauroyl peroxide | 1 | are mixed and copolymerized by heating for 24 hours at 100° C., yielding a solid copolymer having good flame-resisting characteristics.

EXAMPLE 12

| | Parts |
|---|---|
| Styrene | 90 |
| Triallyl cyanurate | 5 |
| Diallyl tetrafluorosuccinate | 5 |
| Benzoyl peroxide | 1 | are mixed and copolymerized by heating for 48 hours at 100° C. A solid copolymer is obtained which swells but does not dissolve when immersed in toluene for several days. Triallyl cyanurate can be prepared, for example, by methods such as are described in the copending applications of James R. Dudley, Serial Nos. 700,839, now Patent No. 2,510,564 June 6, 1950, and 700,840, now abandoned, both of which applications were filed October 2, 1946.

EXAMPLE 13

| | Parts |
|---|---|
| Diallyl tetrafluorosuccinate | 10.0 |
| 2-amino-4,6-dialloxy-1,3,5-triazine | 35.0 |
| Ethylene glycol fumarate (crystalline) | 55.0 |
| Wood flour | 66.7 |
| Benzoyl peroxide | 0.5 |

The above ingredients are mixed for several hours, compacted and sheeted. The sheets are pulverized to form a molding composition, a sample of which is molded for 5 minutes at 100° C. under a pressure of about 50 pounds per square inch. A hard, tough, molded article having good surface finish is obtained. Similar results are obtained when pulverized mica (325 mesh) is substituted for wood flour in the above formula.

EXAMPLE 14

|  | Parts |
|---|---|
| Diallyl tetrafluorosuccinate | 80 |
| Glycol dimethyacrylate | 20 |
| Benzoyl peroxide | 1 | yield a hard, substantially insoluble, substantially infusible resinous copolymer when the mixed ingredients are heated together for 5 hours at 105°–110° C.

EXAMPLE 15

|  | Parts |
|---|---|
| Methyl acrylate | 90 |
| Dimethallyl tetrafluorosuccinate | 10 |
| Benzoyl peroxide | 1 | are mixed and heated together for 24 hours at 70° C. and for another 24 hours at 100° C., yielding a clear, solid copolymer.

EXAMPLE 16

|  | Parts |
|---|---|
| Diallyl tetrafluorosuccinate | 90 |
| Ethyl methacrylate | 10 |
| Benzoyl peroxide | 1 | are heated together for 3 hours at 105° C., yielding a transparent, insoluble, solid copolymer which is somewhat softer than the polymeric solid of Example 3.

EXAMPLE 17

|  | Parts |
|---|---|
| Dimethallyl tetrafluorosuccinate | 100 |
| Ethyl methacrylate | 100 |
| Benzoyl peroxide | 2 | yield a clear, solid copolymer when heated together for 16 hours at 105° C. This copolymer is less hard than the copolymer of Example 8.

EXAMPLE 18

|  | Parts |
|---|---|
| Diallyl tetrafluorosuccinate | 70 |
| Diethylene glycol fumarate sebacate prepared as described under Example 4 | 30 |
| Benzoyl peroxide | 1 | are mixed and warmed to effect solution. A hard, well-cured, transparent, insoluble copolymer is obtained by heating the resulting polymerizable composition for 3 hours at 105° C.

EXAMPLE 19

|  | Parts |
|---|---|
| Triethylene glycol fumarate phthalate [1] | 60.0 |
| Ethylene glycol maleate | 60.0 |
| Diallyl tetrafluorosuccinate | 80.0 |
| Cobalt naphthenate | 0.1 |
| Benzoyl peroxide | 0.5 |

[1] Note.—This unsaturated alkyd resin is prepared by effecting reaction between 4 mols of trimethylene glycol, 3 mols of phthalic anhydride and 1 mol of fumaric acid.

The above ingredients are warmed and thoroughly mixed to effect solution. The cobalt naphthenate is dissolved in toluene and the benzoyl peroxide in dioxane prior to admixture with the other ingredients. The resulting polymerizable composition is flowed upon a tin panel to form a thin coating thereon. Upon baking the coated panel for 1 hour at 110° C., a hard, tack-free, water-resistant film results.

EXAMPLE 20

|  | Parts |
|---|---|
| Diethyl fumarate | 60 |
| Diallyl tetrafluorosuccinate | 40 |
| Benzoyl peroxide | 1 | are mixed and heated together for 3 hours at 105° C., yielding a hard copolymer.

EXAMPLE 21

|  | Parts |
|---|---|
| 2-amino-4,6-dialloxy-1,3,5-triazine | 66.7 |
| Diallyl tetrafluorosuccinate | 33.3 |
| Benzoyl peroxide | 3.0 |

Eight plies of alpha-pulp paper, 10 mils thick, are coated and impregnated with the above mixture of ingredients, warmed to about 60° C. The impregnated sheets are superimposed and then laminated together by heating between glass plates at contact pressure for 2 hours at 100° C. A hard, rigid, laminated article is obtained.

EXAMPLE 22

|  | Parts |
|---|---|
| Diethylene glycol fumarate sebacate prepared as described under Example 4 | 350.0 |
| Triallyl cyanurate | 50.0 |
| Styrene | 50.0 |
| Diallyl tetrafluorosuccinate | 50.0 |
| Benzoyl peroxide | 2.5 | are mixed and warmed on a steam bath to insure complete solution of the peroxide catalyst. A 2-ply laminated article is made by curing between glass plates two superimposed sheets of glass cloth, impregnated with the above polymerizable composition, for 2 hours at 120° C. and at contact pressure. The laminate is completely cured, hard, compact, glossy, transparent and flexible. The copolymer of diethylene glycol fumarate sebacate, triallyl cyanurate, styrene and diallyl tetrafluorosuccinate, which is produced in situ, fills the interstices of the sheets of glass cloth.

It will be understood, of course, by those skilled in the art that our invention is not limited to the specific ingredients named in the above illustrative examples nor to the particular proportions and methods of polymerization and copolymerization given therein. Thus, instead of benzoyl peroxide or lauroyl peroxide, any other polymerization catalyst, numerous examples of which have been mentioned hereinbefore, may be employed. Likewise, tetrafluorosuccinic esters and monomeric materials copolymerizable therewith, other than those set forth in the examples, may be used. Thus, instead of the particular tetrafluorosuccinic esters specified in each example, we may use any other tetrafluorosuccinic ester of the kind embraced by Formula I.

The polymerizable esters and the polymerizable compositions of this invention comprising a mixture of compatible, copolymerizable ingredients of the kind hereinbefore described have a wide variety of applications. For instance, with or without a filler, they may be used in the production of molding compositions and molded articles; as the binder in the production of laminated articles; as coating compositions for use in finishes for wood, metals, plastics, etc., or in the treatment of fibrous materials, e. g., paper, cloth, leather, etc.; as impregnants for fibrous materials and porous metal castings; as electrically insulating compositions, etc. They are especially suitable for use in the manufacture of laminated articles. A fibrous material, e. g., paper or sheets of cloth, asbestos, etc., is impregnated with the polymerizable material in liquid state. The dried, impregnated sheets are superimposed and bonded together under heat (e. g., at 40°–200° C.) and pressure, for instance at pressures ranging from contact pressure up to 4000–5000 pounds per square inch depending upon the particular composition employed. For many purposes where high strength materials are required, glass cloth is especially suitable for the production of laminates, but other fibrous materials may be employed in addition to those aforementioned, e. g., those composed of or comprising cellulose esters (e. g., cellulose acetate), regenerated cellulose fibers, rayons, synthetic fibers, for instance nylon, polyacrylonitrile fibers, vinylidene chloride polymeric compositions such as those sold under the trade name of "Saran," etc. They also may be used in various electrically insulating applications, e. g., as coil impregnants.

These new polymers and copolymers also are particularly useful in the production of molded articles. The compositions may be employed alone or admixed with a filler, dye, pigment, opacifier, lubricant, etc. Among the fillers that may be employed are alpha-cellulose pulp, asbestos fibers, cotton flock, chopped cloth cuttings, glass fibers, wood flour, mica dust, antimony oxide, titanium dioxide, sand, clay, diatomaceous earth, etc.

The polymerizable compositions of this invention also may be employed in the production of castings. They also may be used as adhesives, for instance, in the production of optical devices containing a plurality of elements, examples of which are compound lenses, compound prisms, Nicol prisms, etc.

Natural or other synthetic resins and other modifiers may be incorporated into the polymeric and copolymeric compositions of this invention in order to modify the latter and to obtain products which may be especially suited for a particular service application. Examples of such modifying agents are shellac, ester gums, cellulose esters and ethers, urea-aldehyde resins, aminotriazine-aldehyde resins (e. g., melamine-formaldehyde resins), phenol-aldehyde resins, hydrocarbon-substituted polysiloxane resins, e. g., methyl polysiloxane resins, methyl phenyl polysiloxane resins, phenyl polysiloxane resins, conventional alkyd resins of the non-polymerizable type, etc. The polymers and copolymers of this invention also may be modified by incorporating therewith rubber or synthetic rubber-like products.

We claim:

1. A composition comprising the product of polymerization of a polymerizable mass including a tetrafluorosuccinic ester of a primary, ethylenically unsaturated monohydric alcohol containing at least 3 and not more than 10 carbon atoms and in which the hydroxy group is bonded through carbon to a monovalent, ethylenically unsaturated aliphatic, hydrocarbon grouping.

2. A polymerizable composition comprising (1) a tetrafluorosuccinic diester of a primary, ethylenically unsaturated monohydric alcohol containing at least 3 and not more than 10 carbon atoms and in which the hydroxy group is bonded through carbon to a monovalent, ethylenically unsaturated aliphatic, hydrocarbon grouping and (2) a monomeric material which is different from the compound of (1), is copolymerizable therewith and contains a $CH_2=C<$ grouping.

3. A product comprising the polymerized composition of claim 2.

4. A polymerizable composition comprising (1) a tetrafluorosuccinic diester of a primary, ethylenically unsaturated monohydric alcohol containing at least 3 and not more than 10 carbon atoms and in which the hydroxy group is bonded through carbon to a monovalent, ethylenically unsaturated aliphatic, hydrocarbon grouping and (2) an unsaturated alkyd resin compatible with the compound of (1) and copolymerizable therewith.

5. A product comprising the polymerized composition of claim 4.

6. A polymerizable composition comprising (1) diallyl tetrafluorosuccinate and (2) a monomeric material which is different from the compound of (1), is copolymerizable therewith and contains a $CH_2=C<$ grouping, the diallyl tetrafluorosuccinate of (1) constituting, by weight, at least about 10% of the total weight of the ingredients of (1) and (2).

7. A polymerizable composition comprising (1) diallyl tetrafluorosuccinate and (2) a monovinyl aromatic hydrocarbon which is copolymerizable therewith, the diallyl tetrafluorosuccinate of (1) constituting, by weight, from about 10% to about 90% of the total weight of the ingredients of (1) and (2).

8. A polymerizable composition comprising (1) diallyl tetrafluorosuccinate and (2) an unsaturated alkyd resin which is copolymerizable therewith, the diallyl tetrafluorosuccinate of (1) constituting, by weight, from about 10% to about 90% of the total weight of the ingredients of (1) and (2).

9. A composition comprising the product of polymerization of a polymerizable mass including (1) diallyl tetrafluorosuccinate and (2) a monomeric material which is different from the compound of (1), is copolymerizable therewith and contains a $CH_2=C<$ grouping, the diallyl tetrafluorosuccinate of (1) constituting, by weight, at least about 10% of the total weight of the ingredients of (1) and (2).

10. A copolymer of copolymerizable ingredients including diallyl tetrafluorosuccinate and styrene, the diallyl tetrafluorosuccinate constituting, by weight, at least about 10% of the total weight of the diallyl tetrafluorosuccinate and styrene.

11. A copolymer of copolymerizable ingredients including diallyl tetrafluorosuccinate and an unsaturated alkyd resin obtained by reaction of diethylene glycol, fumaric acid and sebacic acid, the diallyl tetrafluorosuccinate constituting, by weight, at least about 10% of the total weight of the diallyl tetrafluorosuccinate and the said unsaturated alkyd resin.

12. A polymerizable composition comprising (1) dimethallyl tetrafluorosuccinate and (2) a monomeric material which is different from the compound of (1), is copolymerizable therewith and which contains a $CH_2=C<$ grouping, the dimethallyl tetrafluorosuccinate of (1) constituting, by weight, at least about 10% of the total weight of the ingredients of (1) and (2).

13. A composition comprising the product of polymerization of a polymerizable mass including (1) dimethallyl tetrafluorosuccinate and (2) a monomeric material which is different from the compound of (1), is copolymerizable therewith and contains a $CH_2=C<$ grouping, the dimethallyl tetrafluorosuccinate of (1) constituting, by weight, at least about 10% of the total weight of the ingredients of (1) and (2).

17

14. The method of preparing a new synthetic composition which comprises polymerizing a polymerizable mass containing a tetrafluorosuccinic ester of a primary, ethylenically unsaturated monohydric alcohol containing at least 3 and not more than 10 carbon atoms and in which the hydroxy group is bonded through carbon to a monovalent, ethylenically unsaturated aliphatic, hydrocarbon grouping.

15. The method of preparing a new synthetic composition which comprises polymerizing under heat a polymerizable mixture containing (1) a tetrafluorosuccinic diester of a primary, ethylenically unsaturated monohydric alcohol containing at least 3 and not more than 10 carbon atoms and in which the hydroxy group is bonded through carbon to a monovalent, ethylenically unsaturated aliphatic, hydrocarbon grouping, (2) a monomeric material which is different from the compound of (1), is copolymerizable therewith and contains a $CH_2{=}C{<}$ grouping, and (3) a catalyst adapted to accelerate the copolymerization of the compounds of (1) and (2).

16. A copolymer of copolymerizable ingredients including (1) diallyl tetrafluorosuccinate, (2) styrene and (3) an unsaturated alkyd resin obtained by reaction of diethylene glycol, fumaric acid and sebacic acid, the diallyl tetrafluorosuccinate of (1) constituting, by weight, at least about 10% of the total weight of the ingredients of (1), (2) and (3).

17. A copolymer of copolymerizable ingredients including (1) diallyl tetrafluorosuccinate, (2) styrene, (3) triallyl cyanurate and (4) an unsaturated alkyd resin obtained by reaction of diethylene glycol, fumaric acid and sebacic acid.

18. A method as in claim 15 wherein the catalyst of (3) comprises both benzoyl peroxide and cobalt naphthenate.

19. A method as in claim 18 wherein the benzoyl peroxide and cobalt naphthenate are employed in a weight ratio of 5 parts of the former to 1 part of the latter.

20. A copolymer of copolymerizable ingredients including (1) diallyl tetrafluorosuccinate, (2) styrene and (3) an unsaturated alkyd resin obtained by reaction of diethylene glycol, fumaric acid and sebacic acid in the weight ratios of 350 parts of the diallyl tetrafluorosuccinate of (1) to 50 parts each of the styrene and unsaturated alkyd resin of (2) and (3).

21. A copolymer of copolymerizable ingredients consisting solely of (1) diallyl tetrafluorosuccinate, (2) styrene, (3) triallyl cyanurate and (4) an unsaturated alkyd resin obtained by reaction of diethylene glycol, fumaric acid and sebacic acid in the weight ratios of 350 parts of the diallyl tetrafluorosuccinate of (1) to 50 parts each of the styrene, triallyl cyanurate and unsaturated alkyd resin of (2), (3) and (4).

22. The method of preparing and purifying diallyl tetrafluorosuccinate which comprises charging the following ingredients to a reaction vessel from which the air has been removed and is subsequently excluded: tetrafluorosuccinic acid and allyl alcohol in the ratio of 1 mole of the former to approximately 4.4 moles of the latter, anhydrous benzene in an amount by weight which is approximately the same as the amount of allyl alcohol employed, and an esterification catalyst consisting of p-toluene sulfonic acid in an amount by weight corresponding approximately to 5 parts thereof for each 380 parts of tetrafluorosuccinic acid; heating the resulting mixture under gentle reflux until no more water of esterification is evolved; distilling the resulting reaction mass under reduced pressure thereby to obtain a fraction boiling at 65°–68.5° C. at 1 mm. pressure and being constituted of crude diallyl tetrafluorosuccinate; and distilling the said crude diallyl tetrafluorosuccinate over calcium carbonate thereby to obtain purified diallyl tetrafluorosuccinate having the following properties: B. P. 65°–68° C., $n_D^{25}$ 1.3937, and $d_4^{25}$ 1.2526.

EDWARD L. KROPA.
JOHN J. PADBURY.

REFERENCES CITED

The following references are of record in the file of this patent:

UNITED STATES PATENTS

| Number | Name | Date |
|---|---|---|
| 2,202,846 | Garvey | June 4, 1940 |
| 2,269,187 | D'Alelio | Jan. 6, 1942 |
| 2,340,110 | D'Alelio | Jan. 25, 1944 |
| 2,400,099 | Brubaker | May 14, 1946 |
| 2,407,479 | D'Alelio | Sept. 10, 1946 |
| 2,426,224 | Kharasch | Aug. 26, 1947 |
| 2,450,682 | Nordlander | Oct. 5, 1948 |
| 2,453,147 | McBee et al. | Nov. 9, 1948 |

OTHER REFERENCES

Gilman, pp. 960 and 962, Organic Chemistry, 2nd ed., vol. I, pub. 1943 by John Wiley & Sons, N. Y.

Certificate of Correction

Patent No. 2,539,438                                                          January 30, 1951

EDWARD L. KROPA ET AL.

It is hereby certified that error appears in the printed specification of the above numbered patent requiring correction as follows:

Column 4, line 55, before the word "methallyl" insert *allyl 2-butenyl tetrafluorosuccinate,*; column 10, line 61, for "advance" read *advantage*; column 12, line 29, for "bonzoyl" read *benzoyl*; line 67, strike out "now abandoned" and insert instead *now Patent No. 2,537,816, January 9, 1951*; column 13, lines 26 and 27, for "yieldin" read *yielding*; line 61, for "60 0" read *60.0*; column 14, line 13, for "-13,5-" read *-1,3,5-*;

and that the said Letters Patent should be read as corrected above, so that the same may conform to the record of the case in the Patent Office.

Signed and sealed this 5th day of June, A. D. 1951.

[SEAL]

THOMAS F. MURPHY,
*Assistant Commissioner of Patents.*